(12) United States Patent
Phillip (10) Patent No.: US 11,516,445 B1
(45) Date of Patent: Nov. 29, 2022

(54) LIGHT BULB IMAGE PROJECTOR

(71) Applicant: Steven Phillip, Nantucket, MA (US)

(72) Inventor: Steven Phillip, Nantucket, MA (US)

( * ) Notice: Subject to any disclaimer, the term of this patent is extended or adjusted under 35 U.S.C. 154(b) by 28 days.

(21) Appl. No.: 17/202,490

(22) Filed: Mar. 16, 2021

(51) Int. Cl.
*H04N 9/31* (2006.01)
*F21V 33/00* (2006.01)
*G03B 31/00* (2021.01)
*G03B 21/14* (2006.01)
*H04B 7/26* (2006.01)

(52) U.S. Cl.
CPC ....... *H04N 9/3141* (2013.01); *F21V 33/0052* (2013.01); *G03B 21/145* (2013.01); *G03B 31/00* (2013.01); *H04B 7/26* (2013.01)

(58) Field of Classification Search
CPC .............. H04N 9/3141; F21V 33/0052; G03B 21/145; G03B 31/00; H04B 7/26
See application file for complete search history.

(56) References Cited

U.S. PATENT DOCUMENTS

| | | | |
|---|---|---|---|
| 1,928,407 | A | 9/1933 | Batchelor |
| 2,520,513 | A | 8/1950 | Sereno |
| 5,132,589 | A | 7/1992 | Friedman |
| D540,976 | S | 4/2007 | Tournas et al. |
| 2014/0198949 | A1* | 7/2014 | Garlington ........... G03B 21/208 382/103 |
| 2014/0247596 | A1 | 9/2014 | Scianna et al. |

FOREIGN PATENT DOCUMENTS

WO 2016131418 8/2016

* cited by examiner

*Primary Examiner* — Michael E Teitelbaum
(74) *Attorney, Agent, or Firm* — Kyle A. Fletcher, Esq.

(57) ABSTRACT

The light bulb image projector is a projector. The light bulb image projector is electrically powered. The light bulb image projector is configured for use as a substitute for a light bulb in a lamp. The light bulb image projector replaces the light bulb in the lamp. The light bulb image projector screws into the lamp using an Edison screw. The light bulb image projector draws electric energy from the Edison screw. The light bulb image projector incorporates a bulb structure, a projector circuit, and a personal data device. The projector circuit mounts in the bulb structure. The personal data device controls the operation of the projector circuit.

15 Claims, 6 Drawing Sheets

LIGHT BULB IMAGE PROJECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of optical arrangements including projectors, more specifically, housing details for a projection device. (G03B21/145)

SUMMARY OF INVENTION

The light bulb image projector is a projector. The light bulb image projector is electrically powered. The light bulb image projector is configured for use as a substitute for a light bulb in a lamp. The light bulb image projector replaces the light bulb in the lamp. The light bulb image projector screws into the lamp using an Edison screw. The light bulb image projector draws electric energy from the Edison screw. The light bulb image projector comprises a bulb structure, a projector circuit, and a personal data device. The projector circuit mounts in the bulb structure. The personal data device controls the operation of the projector circuit.

These together with additional objects, features and advantages of the light bulb image projector will be readily apparent to those of ordinary skill in the art upon reading the following detailed description of the presently preferred, but nonetheless illustrative, embodiments when taken in conjunction with the accompanying drawings.

In this respect, before explaining the current embodiments of the light bulb image projector in detail, it is to be understood that the light bulb image projector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the light bulb image projector.

It is therefore important that the claims be regarded as including such equivalent construction insofar as they do not depart from the spirit and scope of the light bulb image projector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The light bulb image projector 100 (hereinafter invention) is a projector 123. The invention 100 is electrically powered. The invention 100 is configured for use as a substitute for a light bulb in a lamp 104. The invention 100 replaces the light bulb in the lamp 104. The invention 100 screws into the lamp 104 using an Edison screw 143. The invention 100 draws electric energy from the Edison screw 143. The invention 100 comprises a bulb structure 101, a projector 123 circuit 102, and a personal data device 103. The projector 123 circuit 102 mounts in the bulb structure 101. The personal data device 103 controls the operation of the projector 123 circuit 102. The lamp 104 is defined elsewhere in this disclosure.

The bulb structure 101 is a rigid structure. The bulb structure 101 contains the projector 123 circuit 102. The bulb structure 101 is formed with all apertures and form factors necessary to allow the bulb structure 101 to accommodate the use and operation of the projector 123 circuit 102. Methods to form a bulb structure 101 suitable for the purposes described in this disclosure are well-known and documented in the mechanical arts. The bulb structure 101 is a rotating structure. The bulb structure 101 is formed with a hollow furcated spherical structure. The projector 123 circuit 102 controls the rotation of the bulb structure 101. The projector 123 circuit 102 controls the viewing position of the image projected by the projector 123 circuit 102 by physically rotating the bulb structure 101. An Edison screw 143 of the projector 123 circuit 102 mounts in the exterior surface of the bulb structure 101. The Edison screw 143 screws into the lamp 104 to secure the invention 100 to the lamp 104.

The bulb structure 101 comprises a first spherical section 111, a second spherical section 112, a rotating chamber 113, and a pedestal 114.

The first spherical section 111 is a spherical section. The spherical section is defined elsewhere in this disclosure. The first spherical section 111 is a hollow structure. The first spherical section 111 is formed as a minor spherical section. The first spherical section 111 attaches to a fixed position on the pedestal 114.

The second spherical section 112 is a spherical section. The second spherical section 112 is a hollow structure. The second spherical section 112 is formed as a minor spherical section. The second spherical section 112 is identical to the first spherical section 111. The second spherical section 112 attaches to a fixed position on the pedestal 114. The second spherical section 112 attaches to the pedestal 114 such that the first spherical section 111 and the second spherical section 112 will align to form the ends of a composite prism structure. The composite prism structure is defined elsewhere in this disclosure.

The rotating chamber 113 is a spherical trifurcation. The spherical trifurcation is defined elsewhere in this disclosure. The rotating chamber 113 is a hollow structure. The rotating chamber 113 is formed from a sphere with a radius that is identical to the spheres that form the spherical sections that form the first spherical section 111 and the second spherical section 112. The rotating chamber 113 attaches to the first spherical section 111 such that the rotating chamber 113 rotates relative to the first spherical section 111. The rotating chamber 113 attaches to the second spherical section 112 such that the rotating chamber 113 rotates relative to the second spherical section 112.

The projector 123 of the projector 123 circuit 102 mounts in the rotating chamber 113 such that the rotation of the rotating chamber 113 rotates the direction of the projection of the image projected by the projector 123. The projector 123 circuit 102 provides the motive forces used to rotate the rotating chamber 113 relative to the first spherical section 111 and the second spherical section 112.

The rotating chamber 113 further comprises a projector 123 aperture 115. The projector 123 aperture 115 is an aperture that is formed through the lateral face of the spherical trifurcation structure of the rotating chamber 113. The projector 123 mounts in a fixed position relative to the projector 123 aperture 115 such that the image projected by the projector 123 passes through the projector 123 aperture 115.

The pedestal 114 is a mechanical structure. The pedestal 114 attaches to the first spherical section 111. The pedestal 114 attaches to the second spherical section 112. The first spherical section 111 and the second spherical section 112 attach the rotating chamber 113 to the pedestal 114 such that the first spherical section 111, the second spherical section 112, and the rotating chamber 113 form a composite prism structure that resembles a reassembled spherical structure. The pedestal 114 forms the load path that transfers the loads of the first spherical section 111, the second spherical section 112, the rotating chamber 113, and the projector 123 circuit 102 to the lamp 104. The Edison screw 143 attaches to the exterior surface of the pedestal 114. The Edison screw 143 secures the pedestal 114 to the lamp 104.

Figure 1:
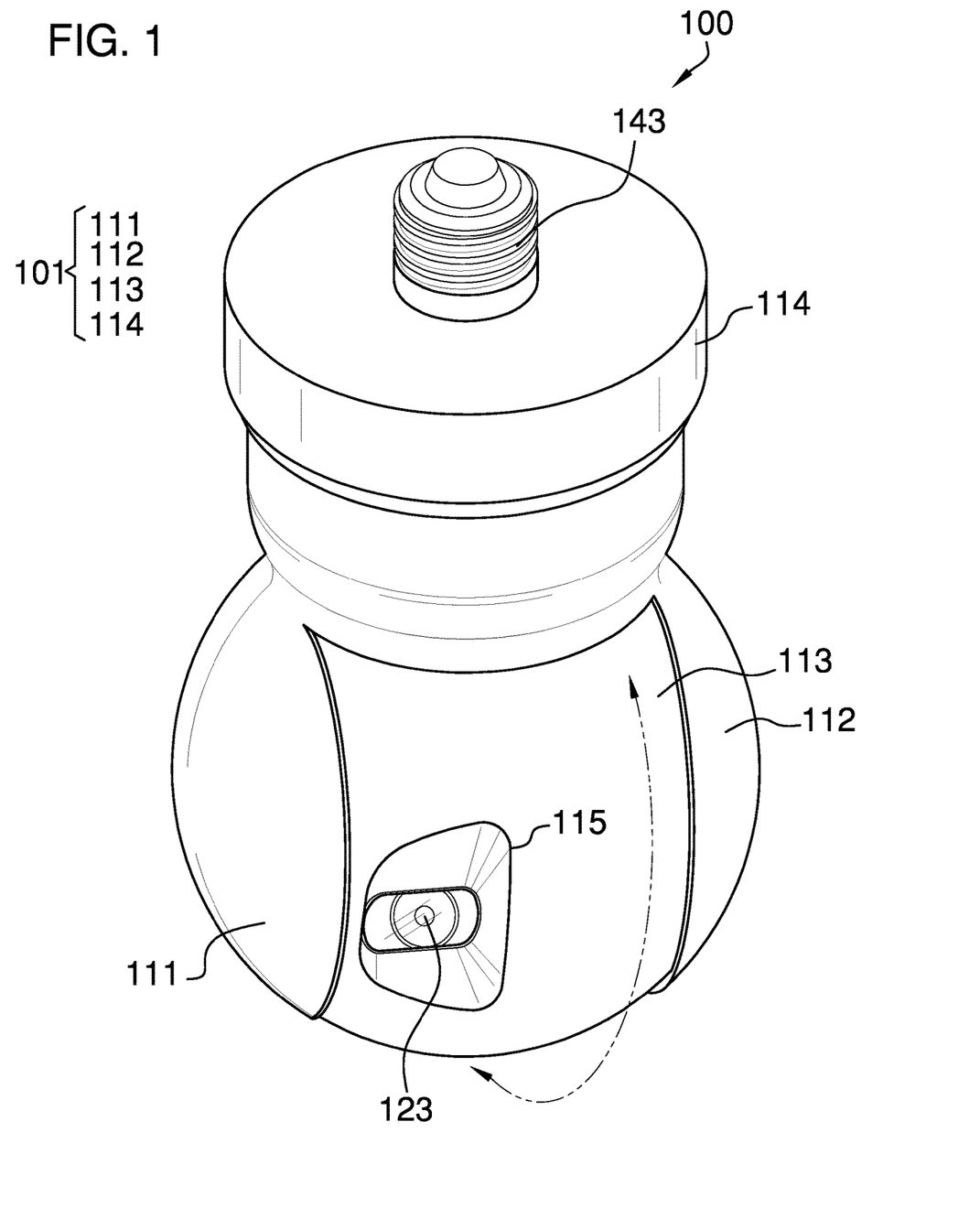
FIG. 1 is a perspective view of an embodiment of the disclosure.
Figure 2:
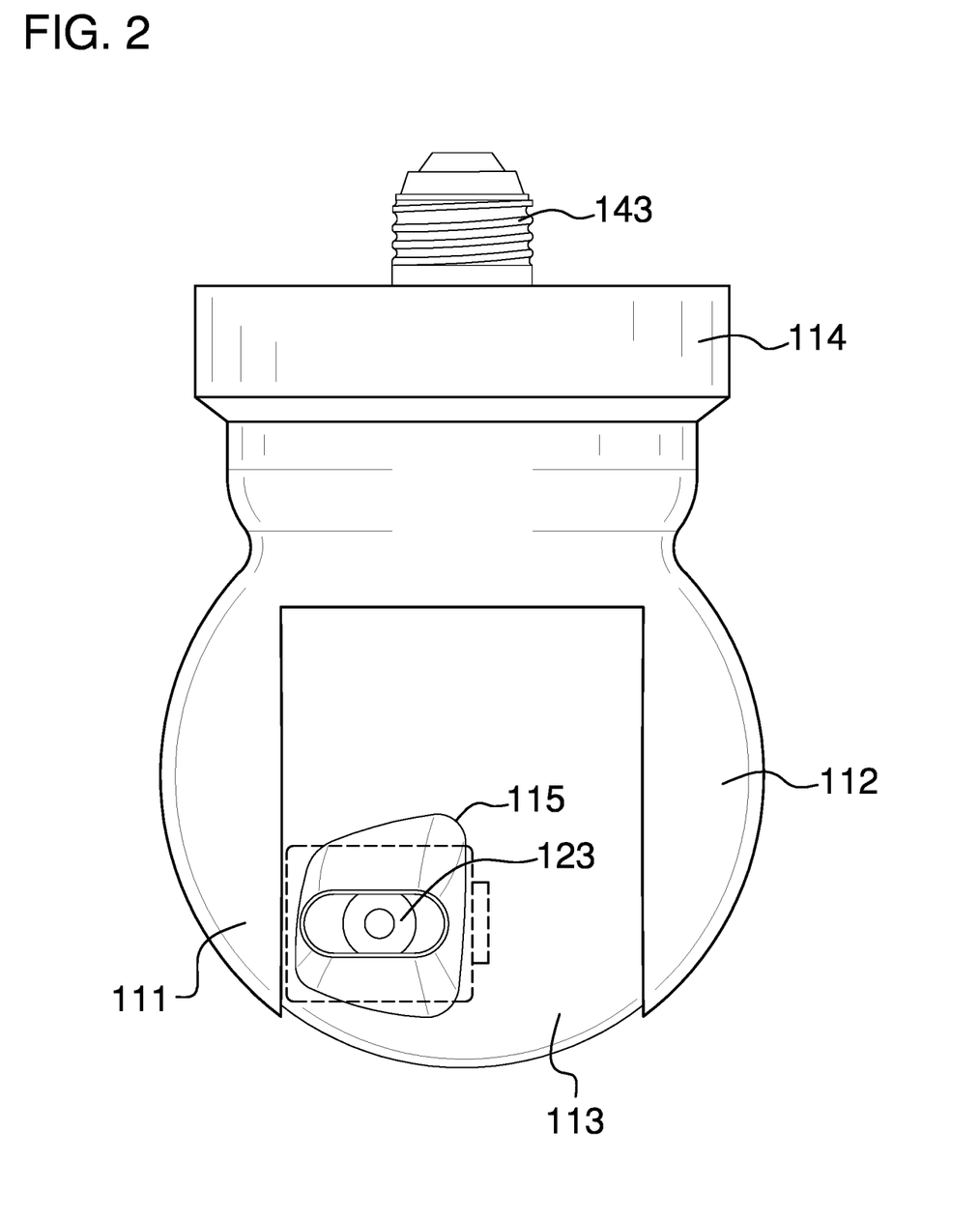
FIG. 2 is a front view of an embodiment of the disclosure.
Figure 3:
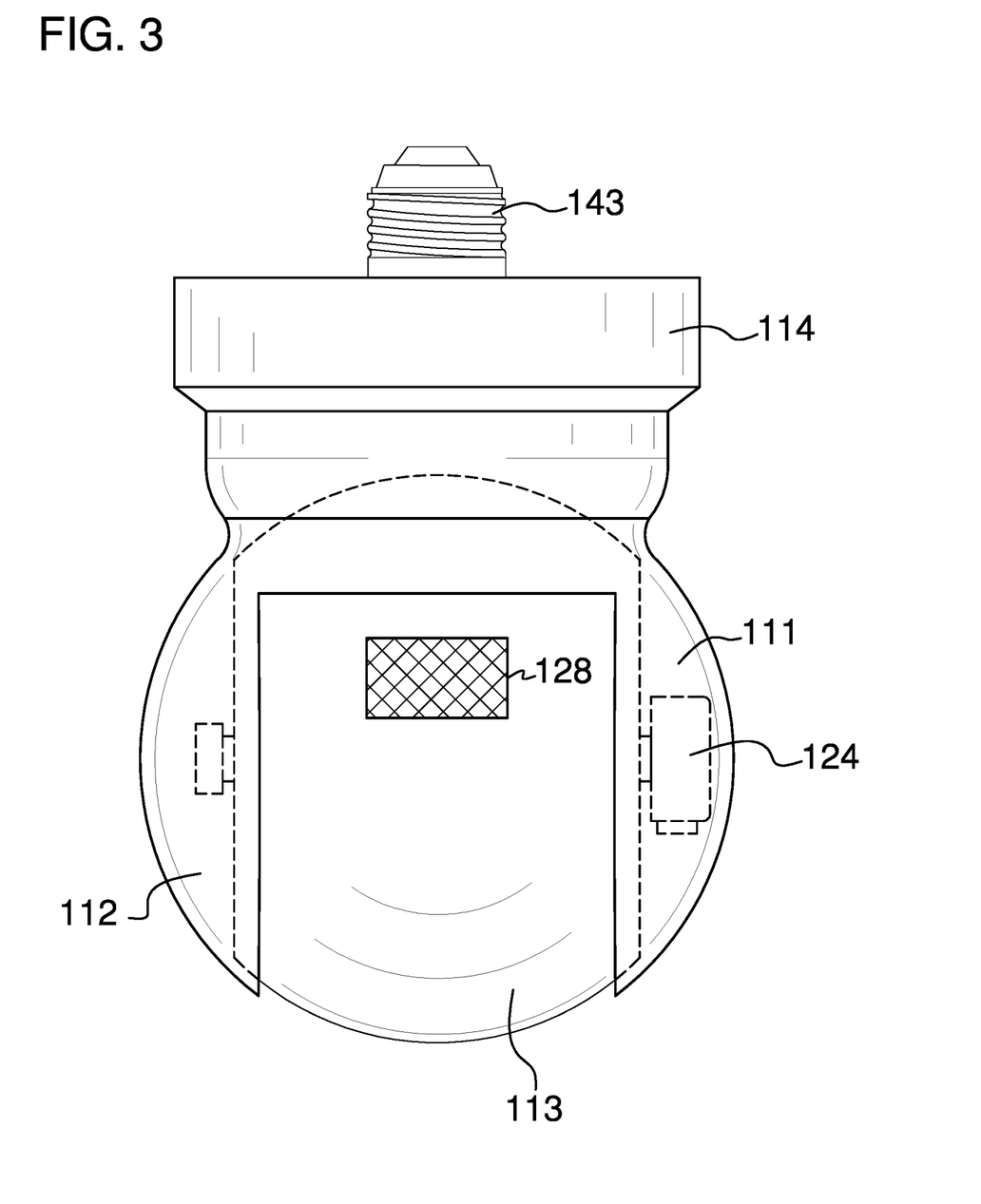
FIG. 3 is a rear view of an embodiment of the disclosure.
Figure 4:
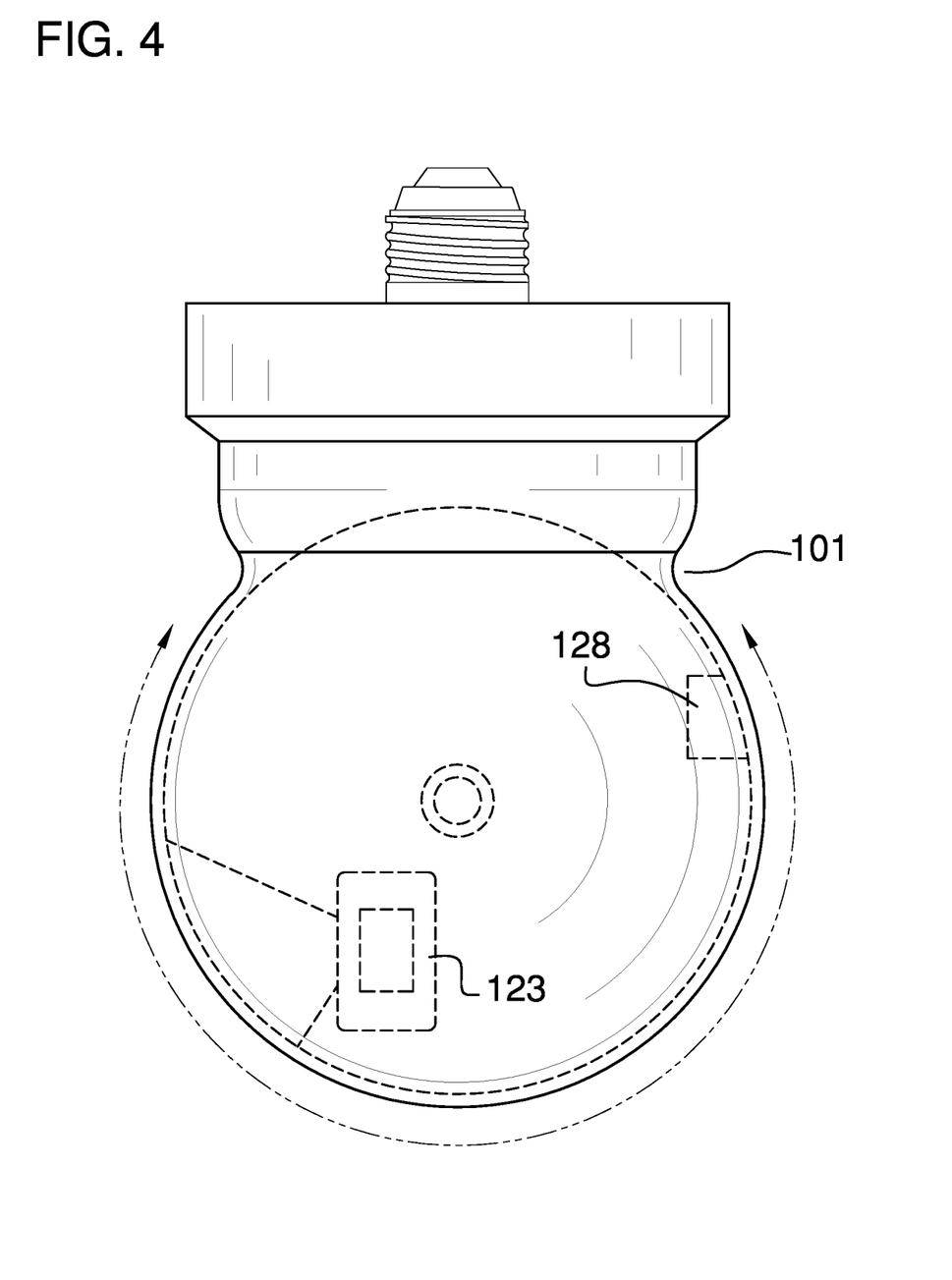
FIG. 4 is a side view of an embodiment of the disclosure.
Figure 5:
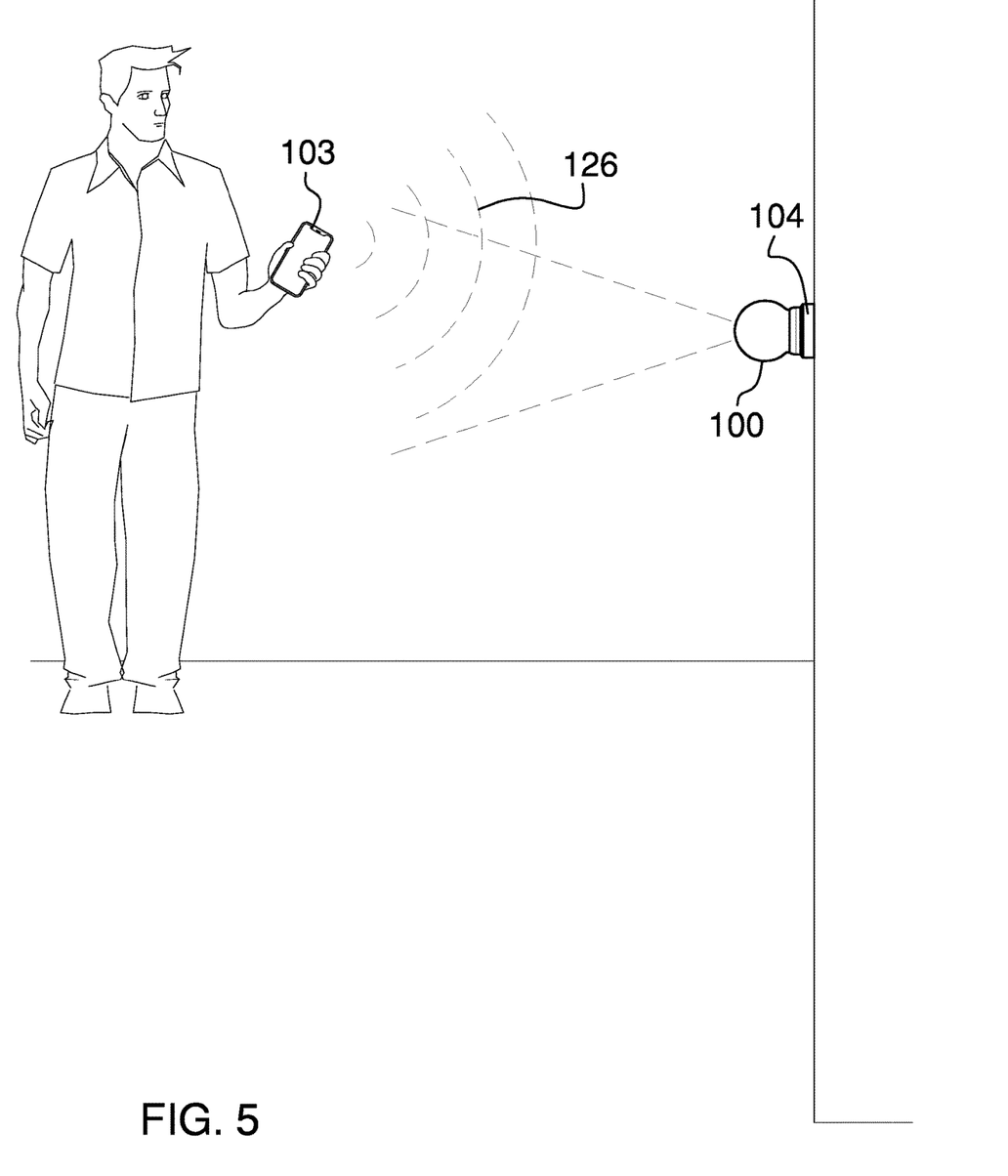
FIG. 5 is an in-use view of an embodiment of the disclosure.
Figure 6:
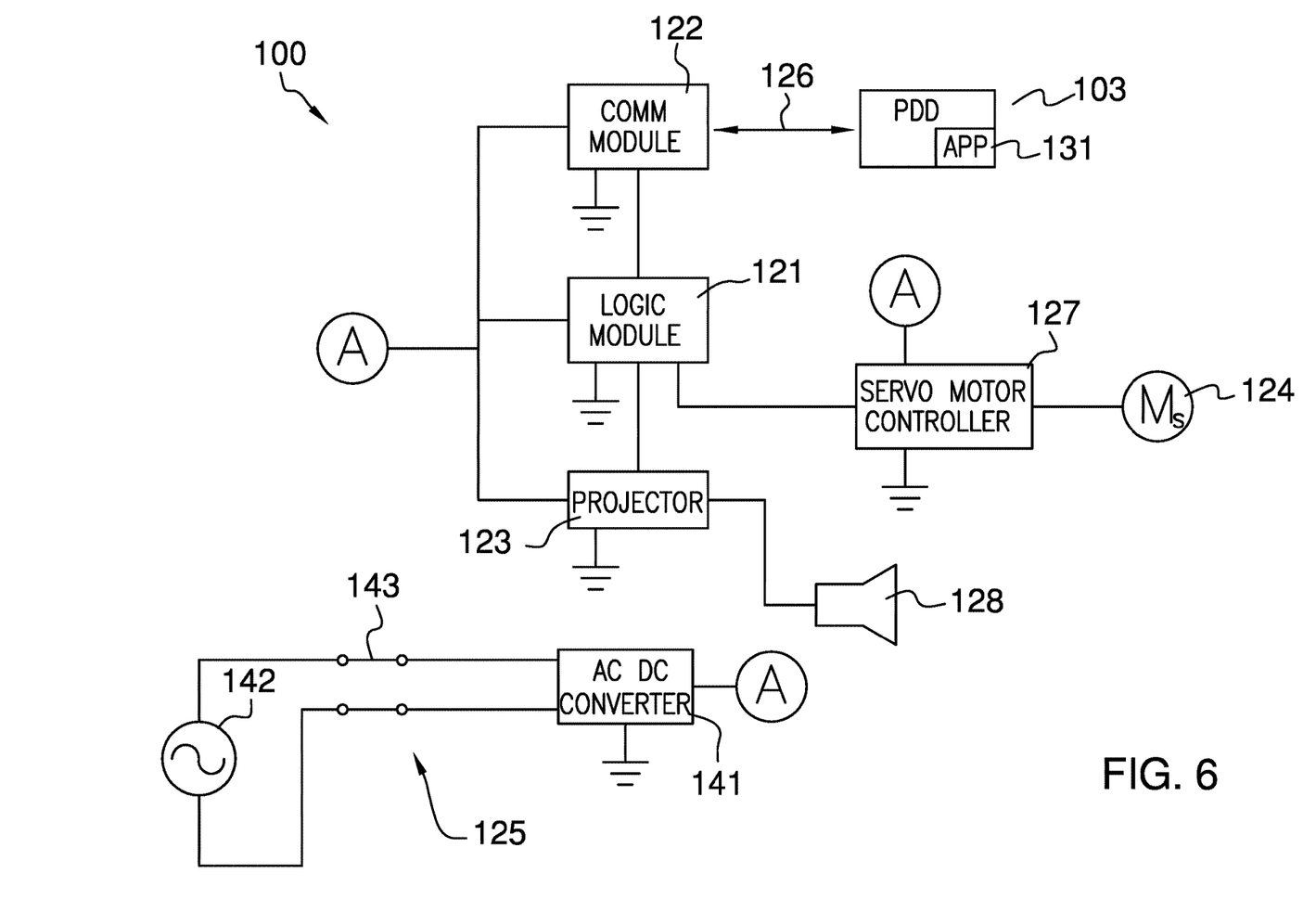
FIG. 6 is a schematic view of an embodiment of the disclosure.

The projector 123 circuit 102 is an electric circuit. The projector 123 circuit 102 generates an image that can be viewed on a viewing surface. The projector 123 circuit 102 projects the image onto the viewing surface. The projector 123 circuit 102 forms a wireless communication link 126 with the personal data device 103. The projector 123 circuit 102 receives the image to be projected from the personal data device 103 over the wireless communication link 126.

The projector 123 circuit 102 adjusts the direction of the projection of the image. The viewing surface that presents the image is selected through the personal data device 103 over the wireless communication link 126. The projector 123 circuit 102 rotates the bulb structure 101 to adjust the direction of the projection of the image. The projector 123 circuit 102 selects the image that is projected. The projected image is selected through the personal data device 103 over the wireless communication link 126. The projector 123 circuit 102 receives and stores the image that is projected. The projected image is transmitted to the projector 123 circuit 102 by the personal data device 103 over the wireless communication link 126.

The projector 123 circuit 102 comprises a logic module 121, a communication module 122, a projector 123, a servo motor 124, and a power circuit 125. The logic module 121, the communication module 122, the projector 123, the servo motor 124, and the power circuit 125 are electrically interconnected. The communication module 122 further comprises a wireless communication link 126.

The logic module 121 is a readily and commercially available programmable electronic device that is used to manage, regulate, and operate the projector 123 circuit 102. Depending on the specific design and the selected components, the logic module 121 can be a separate component within the projector 123 circuit 102 or the functions of the logic module 121 can be incorporated into another component within the projector 123 circuit 102. The communication module 122 is a wireless electronic communication device that allows the logic module 121 to wirelessly communicate with the personal data device 103. Specifically, the communication module 122 establishes a wireless communication link 126 between the projector 123 circuit 102 and the personal data device 103. In the first potential embodiment of the disclosure, the communication module 122 supports a communication protocol selected from the group consisting of a WiFi™ protocol or a Bluetooth™ protocol.

The projector 123 is an electrical device. The projector 123 is defined elsewhere in this disclosure. The projector 123 projects an image that is displayed on a surface. The logic module 121 controls the operation of the projector 123. By controlling the projector 123 is meant that the logic module 121 initiates and discontinues the operation of the projector 123. By controlling the projector 123 is further meant that the logic module 121 provides the projector 123 with the data necessary to generate the image projected by the projector 123. The projector 123 attaches to a fixed position on the interior surface of the lateral face of the rotating chamber 113. The projector 123 is positioned such that the image generated by the rotating chamber 113 is projected through the projector 123 aperture 115.

The projector 123 further comprises a speaker 128. The speaker 128 electrically connects to the projector 123. The speaker 128 is a transducer. The speaker 128 converts electrical signals generated by the projector 123 into audible sounds. The projector 123 uses the speaker 123 to announce audio content that coordinates with the images presented by the projector 123. The speaker 128 mounts in the rotating chamber 113 at a location distal to the projector 123 aperture such that the announcements made through the speaker 128 are projected in the opposite direction of the speaker 128.

The servo motor 124 is an electric motor. The servo motor 124 is defined elsewhere in this disclosure. The servo motor 124 attaches to the interior surface of a structure selected from the group consisting of the first spherical section 111 and the second spherical section 112. The servo motor 124 attaches to the rotating chamber 113 such that the rotation of the servo motor 124 rotates the rotating chamber 113 relative to the rest of the bulb structure 101. The servo motor 124 provides the motive forces used to rotate the rotating chamber 113.

The servo motor 124 further comprises a servo motor 124 controller 127. The servo motor 124 controller 127 is an electric circuit. The servo motor 124 controller 127 is defined elsewhere in this disclosure. The servo motor 124 controller 127 controls the direction of rotation of the servo motor 124. The servo motor 124 controller 127 controls the speed of rotation of the servo motor 124. The servo motor 124 controller 127 controls the position of the projector 123 aperture 115 of the rotating chamber 113 relative to the bulb structure 101. The logic module 121 controls the operation of the servo motor 124 controller 127.

The power circuit 125 is an electric circuit. The power circuit 125 provides the electric energy necessary to operate the projector 123 circuit 102. The power circuit 125 forms an electric connection with the national electric grid 142. The power circuit 125 receives ac electric energy from the national electric grid 142. The power circuit 125 converts the received ac electric energy into dc electric energy used to operate the projector 123 circuit 102. The power circuit 125 further comprises an ac/dc converter 141, a national electric grid 142, and an Edison screw 143. The Edison screw 143 electrically connects the ac/dc converter 141 to the national electric grid 142.

The ac/dc converter 141 is an electric circuit. The ac/dc converter 141 is defined elsewhere in this disclosure. The ac/dc converter 141 receives ac electric energy from the national electric grid 142 through the Edison screw 143. The ac/dc converter 141 converts the received ac electric energy into the dc electric energy. The ac/dc converter 141 transmits the generated dc electric energy to power the operation of the balance of the projector 123 circuit 102.

The national electric grid 142 is an externally provided source of ac electric energy. The national electric grid 142 electrically connects to the Edison screw 143. The national electric grid 142 is defined elsewhere in this disclosure.

The Edison screw 143 is an electromechanical device. The Edison screw 143 is defined elsewhere in this disclosure. The Edison screw 143 screws into the lamp 104 such that the Edison screw 143 physically attaches the invention 100 to the lamp 104. The Edison screw 143 screws into the lamp 104 such that the Edison screw 143 forms an electric connection that transports ac electric energy from the national electric grid 142 to the ac/dc converter 141.

The personal data device 103 is a programmable electrical device. The personal data device 103 further comprises an application 131. The personal data device 103 provides data management and communication services through one or more functions referred to as an application 131. The application 131 is a set of logical operating instructions that are performed by the personal data device 103. The addition of an application 131 will provide increased functionality for the personal data device 103. This disclosure assumes that an application 131 exists for the purpose of interacting with the invention 100. Methods to design and implement an application 131 on a personal data device 103 are well known and documented in the electrical arts.

The application 131 of the personal data device 103 forms an interface with the projector 123 circuit 102. The personal data device 103 transmits operating instructions and the image to be projected over the wireless communication link 126 to the projector 123 circuit 102. The communication module 122 receives the transmitted operating instructions and image to be projected and relays the received operating instructions to the logic module 121.

The following definitions were used in this disclosure:

AC: As used in this disclosure, AC is an acronym for alternating current.

AC/DC Converter: As used in this disclosure, an AC/DC converter is an electrical device that converts an AC voltage into a regulated DC voltage by rectifying and regulating the AC voltage. Method to design and build AC/DC converters are well known in the electrical arts. The AC/DC converter is further defined with a positive terminal, a negative terminal and a power input.

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Application or App: As used in this disclosure, an application or app is a self-contained piece of software that is especially designed or downloaded for use with a personal data device.

Announce: As used in this disclosure, to announce means to generate audible sounds over a transducer.

Bluetooth™: As used in this disclosure, Bluetooth™ is a standardized communication protocol that is used to wirelessly interconnect electronic devices.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated. The plurality of prism structures are joined together such that the center axes (or spherical diameter) of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Communication Link: As used in this disclosure, a communication link refers to the structured exchange of data between two objects.

DC: As used in this disclosure, DC is an acronym for direct current.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Edison Screw: As used in this disclosure, the Edison screw is an electrical connection commonly used to connect a light bulb to a lamp. The Edison screw is formed by an Edison socket and an Edison plug. The electrical connection is formed when the Edison plug screws into the Edison socket. The Edison plug screws into the Edison socket using a threaded connection. The Edison socket has the interior screw thread. The Edison plug has the exterior screw thread.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets).

Form Factor: As used in this disclosure, the term form factor refers to the size and shape of an object.

Furcate: As used in this disclosure, to furcate or furcation refers to the division of an object into a plurality branches, pieces or segments.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Housing: As used in this disclosure, a housing is a rigid structure that encloses and protects one or more devices.

Image: As used in this disclosure, an image is an optical representation or reproduction of an indicia or of the appearance of something or someone.

Indicia: As used in this disclosure, the term indicia refers to a set of markings that identify a sentiment. See sentiment.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Lamp: As used in this disclosure, a lamp is a two terminal electrical device that generates (typically visible spectrum) electromagnetic radiation.

Light Bulb: As used in this disclosure, a lightbulb is a two terminal electrical device that generates visible light to illuminate objects so they can be seen. This definition is intended to include the use of a light emitting diode (LED) as a light bulb.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Motor: As used in this disclosure, a motor refers to the method of transferring energy from an external power source into rotational mechanical energy.

Motor Controller: As used in this disclosure, a motor controller is an electrical device that is used to control the rotational speed, or simply the speed, and the direction of rotation of an electric motor. Motor controllers will generally receive one or more inputs which are used determine the desired rotational speed and direction of rotation of the electric motor.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

PDD: As used in this disclosure, PDD is an acronym for personal data device.

Perimeter: As used in this disclosure, a perimeter is one or more curved or straight lines that bounds an enclosed area on a plane or surface. The perimeter of a circle is commonly referred to as a circumference.

Personal Data Device: As used in this disclosure, a personal data device is a handheld logical device that is used for managing personal information and communication. Examples of personal data device include, but are not limited to, cellular phones, tablets, and smartphones.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Projector: As used in this disclosure, a projector is a device that uses light and a lens system to project an image on a surface.

Screw: As used in this disclosure, to screw is a verb meaning: 1) to fasten or unfasten (unscrew) a threaded connection; or 2) to attach a helical structure to a solid structure.

Sentiment: As used in this disclosure, a sentiment refers to a symbolic meaning or message that is communicated through the use of an image, potentially including a text based image.

Servo: As used in this disclosure, a servo refers to a device that incorporates a feedback mechanism or electrical circuit that allows for the precise angular or linear positioning of the device.

Servo Motor: As used in this disclosure, a servo motor is an electrical motor that further incorporates a feedback circuit that allows for the precise angular positioning of the electric motor.

Socket: As used in this disclosure, a socket is an electrical device that 1) forms an opening or a cavity that acts as a receptacle for an inserted object; and 2) is designed to receive or transfer electricity to or from the object inserted in the socket.

Speaker: As used in this disclosure, a speaker is an electrical transducer that converts an electrical signal into an audible sound.

Sphere: As used in this disclosure, a sphere refers to a structure wherein every point of the surface of the structure is equidistant from a center point.

Spherical Section: As used in this disclosure, a spherical section refers to one of the two objects formed by the bifurcation of a sphere by a plane that does not pass through the center of the sphere. The major section is the spherical section that contains the larger volume. The minor section is the spherical section that contains the smaller volume. A spherical section is commonly called a spherical cap. The term spherical section is also applied to a semi-spherical structure.

Spherical Trifurcation: As used in this disclosure, a spherical trifurcation is a roughly disk-shaped object that is formed from a sphere after two diametrically opposed spherical sections have been removed. The lateral face of the spherical trifurcation has a spherical curvature.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Transducer: As used in this disclosure, a transducer is a device that converts a physical quantity, such as pressure or brightness into an electrical signal or a device that converts an electrical signal into a physical quantity.

WiFi™: As used in this disclosure, WiFi™ refers to the physical implementation of a collection of wireless electronic communication standards commonly referred to as IEEE 802.11x.

Wireless: As used in this disclosure, wireless is an adjective that is used to describe a communication link between two devices that does not require the use of physical cabling.

With respect to the above description, it is to be realized that the optimum dimensional relationship for the various components of the invention described above and in FIGS.

1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An image projection device comprising
a bulb structure, a projector circuit, and a personal data device;
wherein the projector circuit mounts in the bulb structure;
wherein the personal data device controls the operation of the projector circuit;
wherein the projector circuit projects an image;
wherein the image projection device is electrically powered;
wherein the image projection device screws into a lamp using an Edison screw;
wherein the image projection device draws electric energy from the Edison screw;
wherein an Edison screw mounts on the exterior surface of the bulb structure;
wherein the Edison screw screws into the lamp to secure the image projection device to the lamp;
wherein the bulb structure is a rigid structure;
wherein the bulb structure is formed with a hollow furcated spherical structure.

2. The image projection device according to claim 1
wherein the bulb structure is a rotating structure;
wherein the projector circuit controls the rotation of the bulb structure;
wherein the projector circuit controls the viewing position of the image projected by the projector circuit by physically rotating the bulb structure.

3. The image projection device according to claim 2
wherein the bulb structure comprises a first spherical section, a second spherical section, a rotating chamber, and a pedestal;
wherein the first spherical section attaches to a fixed position on the pedestal;
wherein the second spherical section attaches to a fixed position on the pedestal;
wherein the rotating chamber attaches to the first spherical section such that the rotating chamber rotates relative to the first spherical section;
wherein the rotating chamber attaches to the second spherical section such that the rotating chamber rotates relative to the second spherical section;
wherein the pedestal forms the load path that transfers the loads of the first spherical section, the second spherical section, the rotating chamber, and the projector circuit to the lamp.

4. The image projection device according to claim 3
wherein the first spherical section is a spherical section;
wherein the first spherical section is a hollow structure;
wherein the first spherical section is formed as a minor spherical section.

5. The image projection device according to claim 4
wherein the second spherical section is a spherical section;
wherein the second spherical section is a hollow structure;
wherein the second spherical section is formed as a minor spherical section.

6. The image projection device according to claim 5
wherein the second spherical section is identical to the first spherical section;
wherein the second spherical section attaches to the pedestal such that the first spherical section and the second spherical section will align to form the ends of a composite structure.

7. The image projection device according to claim 6
wherein the rotating chamber is a spherical trifurcation;
wherein the rotating chamber is a hollow structure;
wherein the rotating chamber is formed from a sphere with a radius that is identical to the spheres that form the spherical sections that form the first spherical section and the second spherical section;
wherein the projector of the projector circuit mounts in the rotating chamber such that the rotation of the rotating chamber rotates the direction of the projection of the image projected by the projector;
wherein the projector circuit provides the motive forces used to rotate the rotating chamber relative to the first spherical section and the second spherical section.

8. The image projection device according to claim 7
wherein the rotating chamber further comprises a projector aperture;
wherein the projector aperture is an aperture that is formed through the lateral face of the spherical trifurcation structure of the rotating chamber;
wherein the projector mounts in a fixed position relative to the projector aperture such that the image projected by the projector passes through the projector aperture.

9. The image projection device according to claim 8
wherein the projector circuit is an electric circuit;
wherein the projector circuit generates an image;
wherein the projector circuit projects the image;
wherein the projector circuit receives the image to be projected from the personal data device over a wireless communication link;
wherein the projector circuit rotates the bulb structure to adjust the direction of the projection of the image;
wherein the direction of the projection of the image is selected through the personal data device over the wireless communication link.

10. The image projection device according to claim 9
wherein the projector circuit comprises a logic module, a communication module, a projector, a servo motor, and a power circuit;
wherein the logic module, the communication module, the projector, the servo motor, and the power circuit are electrically interconnected;
wherein the communication module further comprises the wireless communication link;
wherein the logic module is a programmable electronic device;
wherein the communication module is a wireless electronic communication device that allows the logic module to wirelessly communicate with the personal data device.

11. The image projection device according to claim 10
wherein the projector is an electrical device;
wherein the projector projects an image that is displayed on a surface;

wherein the logic module controls the operation of the projector;
wherein by controlling the projector is meant that the logic module initiates and discontinues the operation of the projector;
wherein by controlling the projector is further meant that the logic module provides the projector with the data necessary to generate the image projected by the projector;
wherein the projector attaches to a fixed position on the interior surface of the lateral face of the rotating chamber;
wherein the projector is positioned such that the image generated by the rotating chamber is projected through the projector aperture.

12. The image projection device according to claim 11
wherein the projector further comprises a speaker;
wherein the speaker electrically connects to the projector;
wherein the projector uses the speaker to announce audio content that coordinates with the images presented by the projector;
wherein the speaker mounts in the rotating chamber.

13. The image projection device according to claim 12
wherein the servo motor is an electric motor;
wherein the servo motor attaches to the interior surface of a structure selected from the group consisting of the first spherical section and the second spherical section;
wherein the servo motor attaches to the rotating chamber such that the rotation of the servo motor rotates the rotating chamber relative to the rest of the bulb structure;
wherein the servo motor provides the motive forces used to rotate the rotating chamber.

14. The image projection device according to claim 13
wherein the servo motor further comprises a servo motor controller;
wherein the servo motor controller is an electric circuit;
wherein the servo motor controller controls the direction of rotation of the servo motor;
wherein the servo motor controller controls the speed of rotation of the servo motor;
wherein the servo motor controller controls the position of the projector aperture of the rotating chamber relative to the bulb structure;
wherein the logic module controls the operation of the servo motor controller.

15. The image projection device according to claim 14
wherein the power circuit is an electric circuit;
wherein the power circuit provides the electric energy necessary to operate the projector circuit;
wherein the power circuit forms an electric connection with a national electric grid;
wherein the power circuit receives ac electric energy from the national electric grid;
wherein the power circuit converts the received ac electric energy into dc electric energy used to operate the projector circuit.

* * * * *